Aug. 18, 1964     J. R. PRYBYLSKI ET AL     3,144,877
CLUSTERED DUAL VALVE CONTROL FOR ROCKET LIQUID FUEL SYSTEM
Filed Nov. 7, 1961     3 Sheets-Sheet 3

*INVENTORS*
JOHN R. PRYBYLSKI
CLEMENT J. TURANSKY
BY
ATTORNEYS

United States Patent Office 3,144,877
Patented Aug. 18, 1964

3,144,877
CLUSTERED DUAL VALVE CONTROL FOR
ROCKET LIQUID FUEL SYSTEM
John R. Prybylski, Amherst, and Clement J. Turansky,
Tonawanda, N.Y., assignors, by mesne assignments, to
the United States of America as represented by the
Secretary of the Air Force
Filed Nov. 7, 1961, Ser. No. 150,850
1 Claim. (Cl. 137—595)

This invention relates to liquid fuel rocket engines and, more particularly, to the valve control on a gas generating apparatus used to drive the fuel and oxidizer pumps supplying these liquids to the combustion section of the rocket engine.

One elementary method of injecting or pumping liquid fuel and liquid oxidizer into the combustion section is to pressurize the supply tanks with gas at high pressure. A suitable gas would be nitrogen, for example. The basic weakness of this system is a constantly diminishing flow of liquids resulting from the diminishing pressure of the expanding volume of gas.

One common method in current use for forcing liquid fuel and oxidizer into the combustion section is to place centrifugal pumps into the liquid lines and to drive the pumps with high speed gas turbines. Gas must be provided to drive the turbines. One method of providing the required gas is to combust a small amount of the regular fuel and oxidizer in a gas generator independent of the rocket combustion chamber, and to use the products of combustion as the means for powering the turbines.

Such gas generating apparatus may be fuelled by the same pumps which fuel the rocket proper. Since no fuel can be pumped until the turbines are rotated and the turbines cannot be rotated without gas, the operation of the gas generator is initiated by the combustion of a small amount of solid propellant within the chamber. This method of initiation is well known to the art and constitutes no part of this invention.

The products of combustion of the initiating charge are sufficient to bring the turbines to a minimum speed sufficient to pump liquid fuel and oxidizer into the gas generator to sustain combustion. The introduction of the liquid fuel and oxidizer into the gas generator will rapidly increase the volume of available gas to bring the turbines to normal operating speed.

The gas generator should be lightweight, reliable and designed with great care to minimize the likelihood of fuel leaks. The valve control constituting this invention is to accurately control the fuel and oxidizer requirements of the gas generator.

One object of this invention is to provide a simple and reliable valve control for controlling the flow of fuel and oxidizer into the gas generator.

Yet another object of this invention is to provide an integrated control for both fuel and oxidizer in order to hold tubing and pipe connections to a bare minimum, thus reducing the points of possible leakage.

Additional objects, advantages and features of the invention reside in the construction, arrangement and combination of parts involved in the embodiment of the invention as will appear from the following description and accompanying drawings, wherein.

Figure 1:
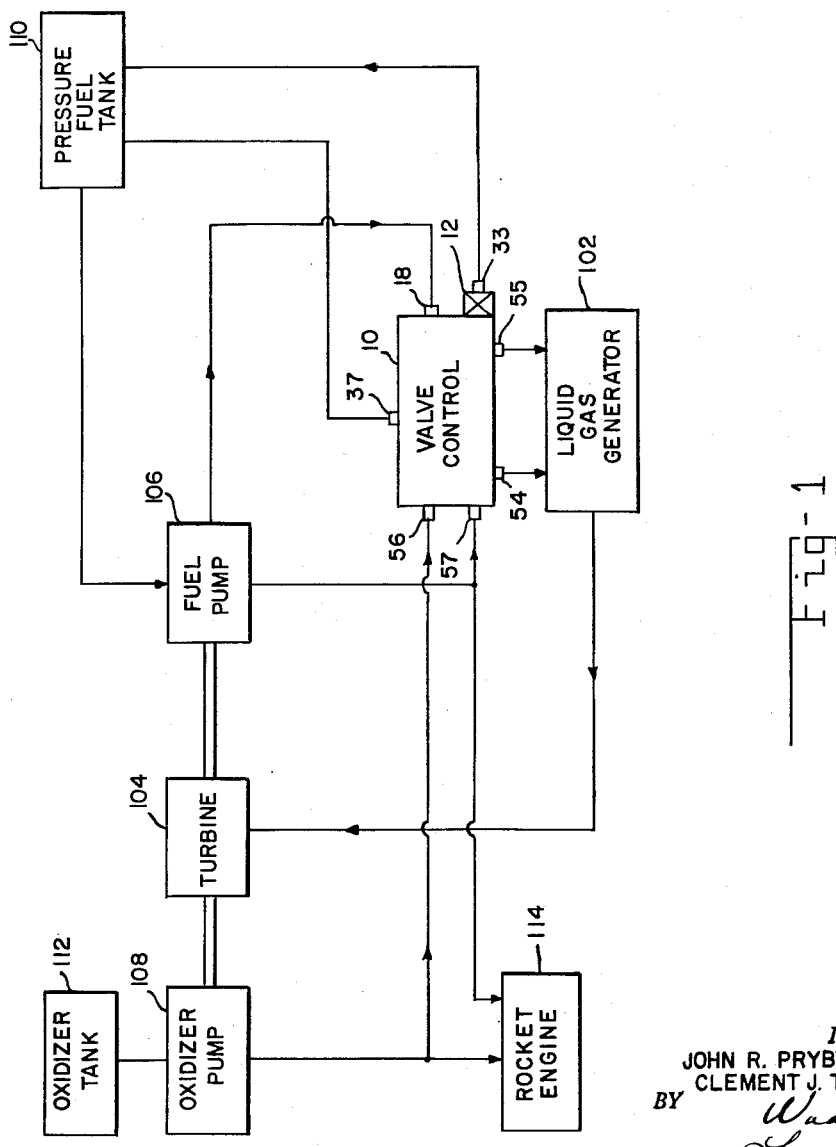
FIG. 1 is a schematic of the fuel system of a rocket engine including a gas generator and valve control as contemplated by this invention.

Referring to FIG. 1, the generator dual valve control 10 controls the flow of fuel and oxidizer into the gas generator 102 in a manner to be hereinafter described. The products of combustion from the gas generator drive turbine 104 which is connected to fuel pump 106 and oxidizer pump 108. If desired, each pump may be driven by an independent turbine. Fuel is supplied from fuel tank 110 and oxidizer from oxidizer tank 112. The fuel and oxidizer from the pumps 106 and 108 pass into the combustion chamber of rocket engine 114 with the exception of the small amounts bled off for combustion within the gas generator. The operation of the system will be more fully explained hereinafter.

The gas generator valve control of the present invention is indicated generally as 10 on the remaining figures, and comprises a pair of poppet valves clustered in a common body housing and actuated by a piston, and is each referred to as feed valve 11; and a solenoid operated valve referred to as piston control valve 12. Feed valve 11 and piston control valve 12 are joined to form a unit structure.

Figure 3:
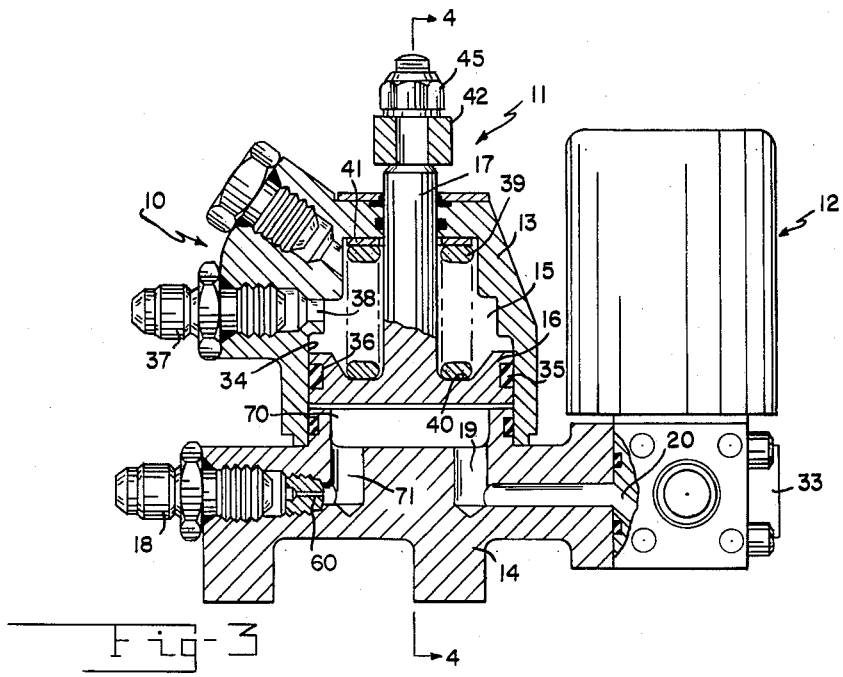
FIG. 3 is a vertical cross section taken on the line 3—3 of FIG. 2.

The body housing comprises an upper housing member 13 and a lower housing member 14. Housing members 13 and 14, when assembled, contain a cavity or chamber 15 and an enlarged cylinder 34 as best shown on FIG. 3 and FIG. 4. Slidably operating within cylinder 34 is piston 16 having integral piston rod 17 slidably extending through an opening in upper housing member 13. O-ring seals may be provided to prevent leakage around the piston stem passing through the housing. Stops are provided to limit the stroke of the piston, the upper limit being established by a shoulder in member 13 and the lower limit being established by the face of a hollow boss on lower housing member 14 which engages the lower end of cylinder 34.

The hollow boss on housing member 14 has a cavity 70 which is substantially of the same diameter as cavity 15 in upper housing member 13. Lower housing member 14 has a passage 71 leading into cavity 70 and containing a restrictive orifice 60 and terminating externally in pipe fitting 18 which connects through a suitable fluid transmission line with the discharge side of the fuel pump as shown in FIG. 1. A similar passage 19 also leads into cavity 70 and communicates with inlet 20 of piston control valve 12. The restrictive orifice 60 greatly restricts the normal flow of fluid for a purpose hereinafter described.

Figure 5:
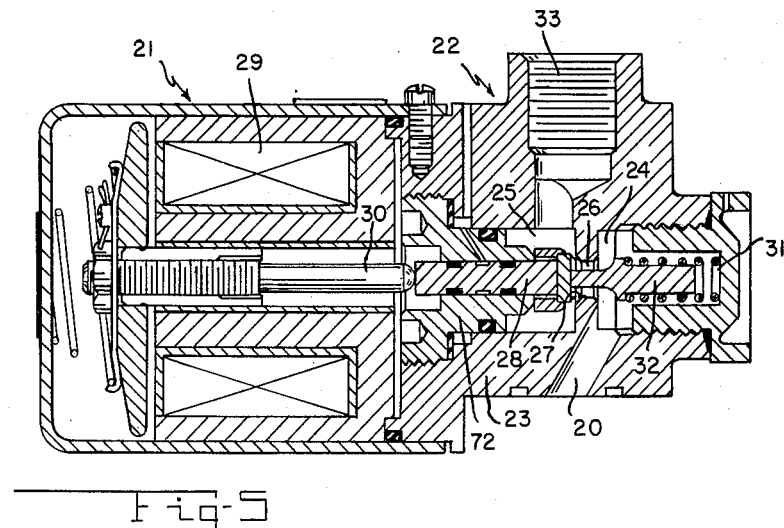
FIG. 5 is a vertical cross section, rotated 90°, of the solenoid operated valve used in the embodiment of this invention.

Referring now in particular to FIG. 5, the piston control valve 12 consists of solenoid end 21 and valve end 22. The valve end includes a body 23 having a lower chamber 24 and an upper chamber 25 communicating with each other through seat opening 26 having valve seat 27 at its upper end. A valve stem 28 is axially slidable in a suitable guide member 72. The valve stem 28 is held in the normally open position by means of pin 32 biased by compression spring 31 and engaging the lower end of valve stem 28 as shown. The flow through valve 12 is arrested by energizing with a suitable electric current the coils 29 which create an electromagnetic field which forces plunger 30 downward to thereby force valve stem 28 against valve seat 27. The valve will remain closed until the flow of current to coils 29 is shut off after which the valve will again assume its normally open position. The upper chamber 25 terminates in a threaded opening 33 forming the discharge opening of valve 12. The fluid discharging from valve 12 is returned to the pressurized fuel tank through a suitable fluid transmission line as shown on FIG. 1.

It is noted that fuel flows from the discharge side of fuel pump 106 into pipe fitting 18, through restrictive orifice 60, into cavity 70, through passage 19 into inlet 20 of valve 12, into chamber 24, through seat opening 26 into chamber 25, out of threaded opening 33 and returns to fuel tank 110.

Again referring to FIG. 3, piston 16 has a piston ring 35 in ring groove 36. A passage 38 communicates with cavity 15 and terminates in pipe fitting 37 which is connected to fuel tank 110 by means of a suitable fluid transmission line as shown on FIG. 1. A suitable compression spring 39 bears against a spring saddle 40 on piston 16 on the one end and a protective washer 41 within upper housing member 13 at the other end. Spring 39 is biased to hold the piston at its downward position.

Restrictive orifice 60 greatly restricts the volume of high pressure fuel coming from the discharge side of the fuel pump and flowing through cavity 70 when the piston control valve 12 is open. Since chamber 15 above piston 16 communicates with and is at the static pressure within the pressurized fuel tank 110, and since the fuel flowing from piston control valve 12 returns to this same fuel tank 110, the fluid pressure on both sides of the piston are approximately the same and the compression spring 39 is able to hold the piston at its downward position. When, however, the solenoid is energized and valve 12 is closed to arrest the fluid flow, the fluid pressure below the piston will increase to fuel pump discharge pressure and move the piston to its uppermost position. When the solenoid is deenergized to open valve 12 and again permit return flow to the fuel tank, the fluid pressure below the piston will drop and permit spring 39 to return the piston to its downward position.

Figure 2:
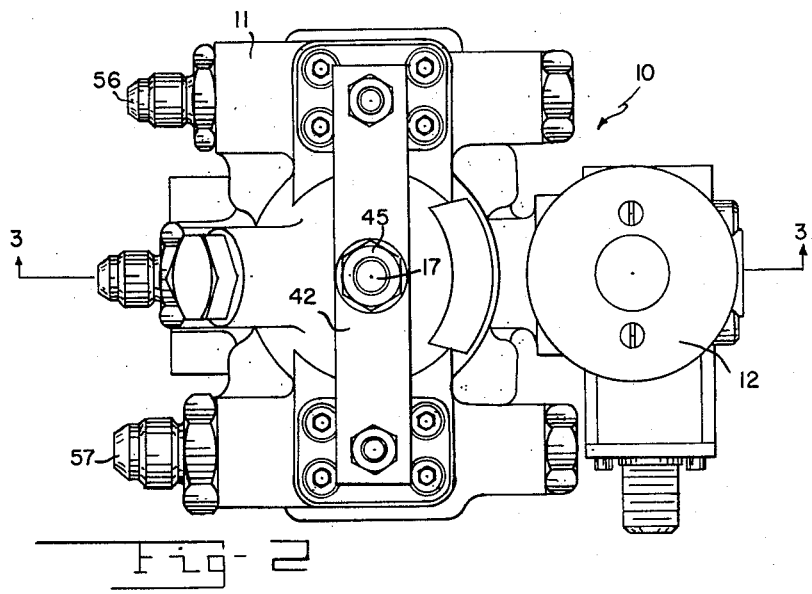
FIG. 2 is a plan view of the valve control constituting this invention.
Figure 4:
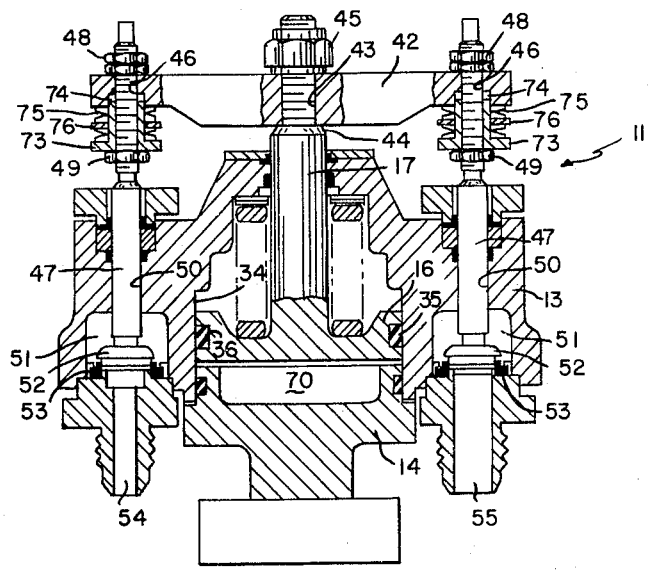
FIG. 4 is a vertical cross section taken on the line 4—4 of FIG. 3.

Referring now in particular to FIGS. 2 and 4, piston 16 is in mechanical communication with and simultaneously operates two poppet valves which control the fuel and oxidizer flow into the gas generator. Cross arm or link 42 having a hole 43 at the mid point through which the threaded end of piston rod 17 passes, rests against shoulder 44 on the piston rod where it is held firmly in place by the nut 45. Holes 46 are provided at each end of link 42. Flanged sleeves 73 slidably engage counterbores 74 in cross arm 42. Disposed between the shoulder on each sleeve 73 and cross arm 42 are a plurality of dish springs 75 and a washer 76.

Again referring to FIG. 4, upper housing member 13 contains two valve chambers 51 terminating in discharge outlet 54 and discharge outlet 55. Each discharge outlet has a valve seat 53 joined thereto. Operably communicating with each valve seat 53 is a valve plug 52 having an integral valve stem 47 axially slidable in a valve guide 50 bored into upper housing member 13. The threaded end of each valve stem 47 passes through the bore of the flanged sleeve 73 and hole 46 in cross arm 42 where it is held in place by nuts 48 and 49. It is obvious on FIG. 4 that nuts 48 and 49 may be adjusted to control the axial location of the valve stem on cross slide 42 and also to control the compression on dish springs 75. The axial location of the valve stems is adjusted to properly hold the valve plugs against their seats when the piston 16 is at its downward position. The dish springs 75 in cooperation with flanged sleeves 73 act as buffer assemblies to absorb any over-travel and thereby prevent damage to the valves.

Communicating with one valve chamber 51 is an inlet 56 as shown on FIG. 2. As shown in FIG. 1, inlet 56 communicates with the discharge side of the oxidizer pump 108 by means of a suitable fluid transmission line, and discharge outlet 54 communicates with the gas generator 102. In like manner, an inlet 57 as shown on FIG. 2 communicates with the second valve chamber 51. Inlet 57 communicates with the discharge side of the fuel pump 106 by means of a suitable fluid transmission line, and discharge outlet 55 communicates with the gas generator.

The operation of the gas generator is initiated by the combustion of a small amount of solid propellant within the chamber. The products of combustion enter and commence bringing turbine 104 to normal speed. The solenoid is energized at the time the engine is armed. The compression spring 39 is sized to permit the valve to open when the pressure in the chamber below the piston reaches approximately 250 p.s.i.g. at which time the pumps are at 50% speed. The solenoid valve is de-energized on command shutdown.

It is to be understood that the embodiment of the present invention as shown and described is to be regarded as illustrative only and that the invention is susceptible to variations, modifications and changes within the scope of the appended claim.

We claim:

A clustered dual valve control for use on a liquid fuel rocket engine system having a gas generator combusting liquid fuel and oxidizer supplied from a pressurized liquid fuel supply tank and a liquid oxidizer supply tank for powering a fuel pump and an oxidizer pump delivering liquid fuel and oxidizer to the rocket engine and gas generator and comprising: a body housing containing a closed cylindrical cavity at the mid section, a piston axially operable within said closed cylindrical cavity and having on one end a free face and on the opposite end having an integral piston rod the free end of which extends through said body housing, a first valve means within said body housing parallel to said closed cylindrical cavity and having inlet and outlet means for the passage of liquid fuel, a second valve means within said body housing parallel to said closed cylindrical cavity and having inlet and outlet means for the passage of liquid oxidizer, connecting means joining said first and said second valve means to the free end of the piston rod on said piston for simultaneous movement therewith to open and close said valve means, a compression spring means coaxial with the piston rod and disposed between said piston and said body housing for biasing said first and said second valve means to the normally closed position, inlet passage means in said body housing communicating with the free face of said piston in said cylindrical cavity adapted for joining said cylindrical cavity to the discharge side of said fuel pump, discharge passage means in said body housing communicating with the free face of said piston in said cylindrical cavity adapted for joining said cylindrical cavity to said fuel supply tank, said inlet passage means being smaller than said discharge passage means; static pressure sensing passage means in said body housing communicating with the piston rod end of said piston in said cylindrical cavity adapted for joining said cylindrical cavity to said fuel supply tank, and normally open valve means in said discharge passage means, said last-named valve means being closable to block the flow from said discharge passage means permitting the fuel discharge pressure from said fuel pump to move said piston against the bias of said compression spring means and simultaneously open said first and said second valve means.

References Cited in the file of this patent

UNITED STATES PATENTS

| | | |
|---|---|---|
| 1,435,921 | Grossenbacher | Nov. 21, 1922 |
| 1,551,651 | Everhart | Sept. 1, 1925 |
| 2,380,827 | Downs | July 31, 1945 |
| 2,816,417 | Bloomberg | Dec. 17, 1957 |
| 2,949,007 | Aldrich et al. | Aug. 16, 1960 |
| 2,993,508 | Wagner | July 25, 1961 |
| 3,009,478 | Lehman | Nov. 21, 1961 |